US010287451B2

(12) United States Patent
Tai et al.

(10) Patent No.: US 10,287,451 B2
(45) Date of Patent: May 14, 2019

(54) IN-SITU HEATED DISPOSITION OF PARYLENE TO ENHANCE PORE PENETRATION INTO SILICONE

(71) Applicant: California Institute of Technology, Pasadena, CA (US)

(72) Inventors: Yu-Chong Tai, Pasadena, CA (US); Dongyang Kang, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 15/276,328

(22) Filed: Sep. 26, 2016

(65) Prior Publication Data

US 2017/0009097 A1 Jan. 12, 2017

Related U.S. Application Data

(62) Division of application No. 14/509,226, filed on Oct. 8, 2014, now Pat. No. 9,469,778.

(Continued)

(51) Int. Cl.
*B32B 19/00* (2006.01)
*C09D 165/04* (2006.01)
(Continued)

(52) U.S. Cl.
CPC ............. *C09D 165/04* (2013.01); *B05D 1/60* (2013.01); *C03C 17/328* (2013.01);
(Continued)

(58) Field of Classification Search
CPC ........ C09D 165/04; B05D 1/60; C03C 17/328
See application file for complete search history.

(56) References Cited

U.S. PATENT DOCUMENTS

2002/0189455 A1* 12/2002 Lamon ................. B01D 53/228
96/12
2009/0215209 A1 8/2009 Anc et al.
(Continued)

FOREIGN PATENT DOCUMENTS

| KR | 1020120088243 | 8/2012 |
| WO | WO 2013044217 | 3/2013 |
| WO | WO 2015057453 | 4/2015 |

OTHER PUBLICATIONS

Juneja et al. Dielectric barriers, pore sealing, and metallization, Thin Solid Films 504 (2006) 239-242. (Year: 2006).*

(Continued)

*Primary Examiner* — Kelly M Gambetta
(74) *Attorney, Agent, or Firm* — Kilpatrick Townsend & Stockton LLP (57) ABSTRACT

A composition of matter is described in which a porous material, such as polydimethylsiloxane (PDMS), is coated with parylene N, C, D, or AF-4 by vapor deposition polymerization while a temperature of the porous material's surface being coated is heated to between 60° C. and 120° C., or 80° C. and 85° C., during deposition. The parylene forms nano roots within the porous material that connect with a conformal surface coating of parylene. In some embodiments, a watertight separation chamber in an integrated microfluidic liquid chromatography device is fabricated by heating tunnels in micro-fabricated PDMS and depositing parylene within the heated tunnels.

12 Claims, 10 Drawing Sheets

Related U.S. Application Data (60) Provisional application No. 61/892,247, filed on Oct. 17, 2013.

(51) Int. Cl.
    *B05D 1/00* (2006.01)
    *C03C 17/32* (2006.01)

(52) U.S. Cl.
    CPC ...... *C03C 2217/20* (2013.01); *C03C 2217/76* (2013.01); *C03C 2218/152* (2013.01); *C08G 2261/3424* (2013.01); *C08G 2261/65* (2013.01); *Y10T 428/249958* (2015.04)

(56) References Cited

U.S. PATENT DOCUMENTS

| | | | | |
|---|---|---|---|---|
| 2013/0122301 | A1* | 5/2013 | Mastrangelo | G01F 1/704 428/402 |
| 2013/0131482 | A1* | 5/2013 | Fedder | A61B 5/0478 600/378 |
| 2015/0111023 | A1 | 4/2015 | Tai et al. | |

OTHER PUBLICATIONS

Chen et al. Conformal coating of parylene for surface anti-adhesion in polydimethylsiloxane (PDMS) double casting technique, Sensors and Actuators A 189 (2013) 143-150. (Year: 2013).*

Zhang et al. Temperature-dependent gas transport performance of vertically aligned carbon nanotube/parylene composite membranes, Nanoscale Research Letters, 2014, 9:448. (Year: 2014).*

Lei et al. Fabrication and Characterization of Parylene C-Caulked PDMS for Low-Permeable Microfluidics, MEMS 2011, Cancun, Mexico, Jan. 23-27, 2011. (Year: 2011).*

U.S. Appl. No. 14/509,226 , "Non-Final Office Action", dated Dec. 14, 2015, 11 pages.

U.S. Appl. No. 14/509,226 , "Notice of Allowance", dated Jun. 20, 2016, 9 pages.

U.S. Appl. No. 14/509,226 , "Restriction Requirement", dated Oct. 30, 2015, 6 pages.

Eddington et al., "Thermal aging and reduced hydrophobic recovery of polydimethylsiloxane," Sensors and Actuators B, Mar. 30, 2006, vol. 114, pp. 170-172.

Fortin et al., "A Model for the Chemical Vapor Deposition of Poly(para-xylylene) (Parylene) Thin Films," Chem. Mater, 2002, vol. 14, pp. 1945-1949.

Jezewski et al., "Molecular Caulking, A Pore Sealing CVD Polymer for Ultralow κ Dielectrics," Journal of the Electrochemical Society, 2004, vol. 151(7), pp. F157-F161.

Kang et al., "Effects of Deposition Temperature on Parylene-C Properties," MEMS Jan. 2013, pp. 389-392.

Kang et al., "In Situ Heating to Improve Adhesion for Parylene-on-Parylene Deposition," NEMS Mar. 2012, pp. 226-229.

Kendall, "Thin-film peeling—the elastic term,"Journal of Physics D—Applied Physics, 1975, vol. 8, pp. 1449-1452.

Kramer et al., "Polymerization of Para-Xylylene Derivatives (Parylene Polymerization), I. Deposition Kinetics for Parylene N and Parylene C," Journal of Polymer Science: Polymer Chemistry Edition, 1984, vol. 22, pp. 475-491.

PCT/US2014/059692 , "International Preliminary Report on Patentability", dated Apr. 28, 2016, 9 pages.

PCT/US2014/059692 , "International Search Report and Written Opinion", dated Jan. 30, 2015, 10 pages.

Sawano et al., "Sealing method of PDMS as elastic material for MEMS", Proceedings on Micro Electro Mechanical Systems, Jan. 13-17, 2008, pp. 419-422.

Sawano et al., "Sealing Method of PDMS as Elastic Material for MEMS." MEMS Jan. 2008, pp. 419-422.

Senkevich et al., "Thermomechanical Properties of Parylene X, A Room-Temperature Chemcial Vapor Depositable Crosslinkable Polymer," Chem. Vap. Deposition, 2007, vol. 13, pp. 55-59.

Shin et al., "PDMS-based micro PCR chip with Parylene coating", Journal of Micromechanics and Microengineering, vol. 13, No. 5, Jun. 20, 2003.

Sumoto et al., "An In-situ End-Point Detector for Parylene CVD Deposition", Proceedings of 16th IEEE International Micro Electro Mechanical Systems Conference, MEMS 2003, Kyoto, Japan, Jan. 19-23, 2003, pp. 598-601.

* cited by examiner

ROOM TEMPERATURE

FIG. 3

DEPOSITED AT 85°

IN-SITU HEATED DISPOSITION OF PARYLENE TO ENHANCE PORE PENETRATION INTO SILICONE

CROSS-REFERENCES TO RELATED APPLICATIONS

This application is a divisional application of U.S. application Ser. No. 14/509,226, filed Oct. 8, 2014, which claims the benefit of U.S. Provisional Application No. 61/892,247, filed Oct. 17, 2013, which is hereby incorporated by reference in its entirety for all purposes.

STATEMENT AS TO RIGHTS TO INVENTIONS MADE UNDER FEDERALLY SPONSORED RESEARCH AND DEVELOPMENT

NOT APPLICABLE

BACKGROUND

1. Field of the Art

Embodiments of the present invention generally relate to the manufacturing of plastics, particularly vapor deposition polymerization of parylene onto a porous material with heat to grow roots of parylene within the pores.

2. Description of the Related Art

Parylene is a generic name for members of a series of poly(p-xylylene) polymers.

Parylene polymer is known to excel as a dielectric and as a water vapor barrier without being toxic. Having been commercialized in the 1960s, parylene has found widespread use in the electronics, automotive, aerospace, medical, and other industries. It generally has preferable chemical vapor depositing attributes compared to other conformal coating materials such as acrylics, epoxies, polyurethanes, and silicones. For example, some parylenes can be deposited in extremely thin layers that are relatively strong and essentially pinhole-free. It is precisely these depositing characteristics that make parylene useful in micro/nanofabrication.

Parylene N is the basic member of the series. It is commonly derived from [2.2]paracyclophane, which can be synthesized fromp-xylene. Parylene N is typically a completely linear, highly crystalline material.

Parylene C, which has one chlorine group per repeat unit, is another of the series. It is typically produced from the same dimer as parylene N but having a chlorine atom substituted for one of the aromatic hydrogen atoms. Its ease of use and especially well-mannered chemical vapor deposition characteristics make it ideal for use as a conformal coating on printed circuit boards and as a structure or sacrificial intermediate in nanofabricated devices. Its demonstrated bio-compatibility as a United States Pharmacopeial Convention (USP) Class VI biocompatible polymer makes it suitable for medical devices.

Parylene D, which has two chlorine groups per repeat unit, is another common parylene of the series. Although it has better diffusion characteristics than parylene C, parylene D generally deposits less uniformly than parylene C.

Parylene AF-4, with the alpha hydrogen atoms of the N dimer replaced with fluorine, is another parylene of the series. Parylene AF-4 is also known as Parylene SF when manufactured by Kisco Conformal Coating, LLC of California (a subsidiary of Kisco Ltd. of Japan) or PARYLENE HT® when manufactured by Specialty Coating Systems, Inc. of Indianapolis, Ind.

Other parylenes, such as parylene VT-4, parylene A, parylene AM, and parylene X, are known in the art and are used for specialized products in industry.

Fundamental aspects of parylene N and parylene C are detailed in P. Kramer et al., "Polymerization of Para-Xylylene Derivatives (Parylene Polymerization). I. Deposition Kinetics for Parylene N and Parylene C," *Journal of Polymer Science: Polymer Chemistry Edition*, Vol. 22 (1984), pp. 475-491. This journal article is hereby incorporated by reference in its entirety for all purposes.

Fundamental aspects of parylene X are detailed in J. Senkevich et al., "Thermomechanical Properties of Parylene X, A Room-Temperature Chemical Vapor Depositable Crosslinkable Polymer," *Chem. Vap. Deposition,* 2007, 13, pp. 55-59. This journal article is hereby incorporated by reference in its entirety for all purposes.

Parylene does not adhere well to some materials, such as polydimethylsiloxane (PDMS). PDMS is a silicone that is widely used for bio-devices, bio-chips, and implants because of its biocompatibility. PDMS is porous, often containing nanometer-scale channels through which liquid water and other body fluids can pass. One type of PDMS is Sylgard 184, manufactured by Dow Corning Corporation, Midland, Mich., U.S.A.

There is a need in the art for better design flexibility in combining biocompatible materials for prosthetics and other devices.

BRIEF SUMMARY

Generally, fabrication methods for depositing, by vapor deposition polymerization, parylene onto porous materials, such as PDMS, are described. The top surface of a thin film of PDMS (or other porous material) material is heated from underneath the material using a hot plate. The surface is raised to a temperature between 60° C. and 120° C. (degrees Celsius) while parylene is deposited. The deposited parylene works its way into pores forming "roots" down past 8 µm, and preferably 10.5 µm in depth. Without stopping the deposition, the parylene continues to deposit on the surface of the PDMS such that the surface layer of parylene integrally forms with the roots.

The surface of the porous material can be heated using infrared (IR), visible light, or ultraviolet light (UV) lamps, convection heating, and/or heating a nearby surface using a heating pad or other device.

Laboratories on a chip, commonly called "bio-chips," can be manufactured using the processes described. Etched channels in a substrate can be coated on the bottom and then over with PDMS or other porous materials in order to create tunnels aligned with the channels. Hot air or other means can be used to heat the PDMS surfaces within the tunnels while parylene is deposited within the tunnels on the surfaces. The parylene works its way into the pores of the PDMS surfaces and creates roots, and a surface layer of parylene grows on top. The surface later of parylene and its roots are integrally formed with one another.

Compositions of matter and products manufactured from the processes described are encompassed in this disclosure, such as parylene surface coatings over porous materials.

Some embodiments of the invention are related to a method of adhering parylene to a porous surface. The method includes providing a porous material, heating a surface of the porous material to a temperature in a range including and between 60° C. and 120° C., depositing parylene, using vapor deposition polymerization, onto the heated surface of the porous material to form root structures of parylene within the porous material and a surface coating of parylene integrally formed with the root structures, and allowing the material to cool.

The surface can be heated to a range between 60° C. and 100° C. or 80° C. and 85° C. The porous material can include silicone such as polydimethylsiloxane (PDMS) silicone. The depositing can occur over a time sufficient to grow root structures to a depth of at least 8 µm or 10.5 µm within the within the porous material.

The porous material can be 5% porous glass, dimethyle siloxane, decamethyl cyclopentasiloxane, or silicone resin. The heating can include contacting a heating pad to a portion of the porous material, directing an infrared lamp or ultraviolet lamp at the surface, or directing heated, convective air currents toward the surface. The porous material can be configured as a sheet such that a thickness of the sheet is equal to or less than 10% of a length and a width of the sheet. The heating can include contacting a heating plate on a side opposite or adjacent the surface upon which parylene is to be deposited in order to heat the surface through the bulk material.

The parylene can be parylene N, parylene C, and parylene AF-4. Parylene D may be suitable for some uses.

Some embodiments are related to a composition of matter. The composition of matter can include a porous material (including a microporous material), a parylene coating over a surface of the porous material, and root structures of parylene extending from the surface of the porous material to a depth of at a depth of at least 8 µm within the porous material, the root structures integrally formed with the parylene coating.

The porous material can include silicone, such as polydimethylsiloxane (PDMS) silicone. The parylene can consist of parylene N, parylene C, or parylene AF-4. The porous material can be configured as a sheet such that a thickness of the sheet is equal to or less than 10% of a length and a width of the sheet.

Some embodiments are related to a method of manufacturing an integrated microfluidic liquid chromatography device. The method can include providing a substrate having an etched channel, coating polydimethylsiloxane (PDMS) silicone into and over the etched channel sufficient to coat of portion of a bottom of and seal over the channel to create a tunnel region, heating the tunnel region to a temperature in a range including and between 60° C. and 120° C., depositing parylene, using vapor deposition polymerization, in the heated tunnel region in order to form root structures of parylene within a surface of the tunnel region and a surface coating of parylene integrally formed with the root structures, and allowing the tunnel region to cool.

A further understanding of the nature and the advantages of the embodiments disclosed and suggested herein may be realized by reference to the remaining portions of the specification and the attached drawings.

DETAILED DESCRIPTION

In-situ heated deposition is hereby demonstrated to improve parylene-on-parylene adhesion and has led to the thorough investigation of deposition temperature effects on thermal, structural and mechanical properties of parylene C. This pore-sealing feature of parylene deposition can be used to coat porous materials for the technical advantage of reducing gas or moisture permeation.

For example, the methods can be used to create parylene-caulked PDMS for a long-term pneumatic balloon actuator. As another example, parylene coatings onto porous ultralow-k interlayer dielectrics can be used to prevent precursor penetration during subsequent metalorganic deposition.

In experimenting with these novel manufacturing methods, the inventors hypothesize that the surface mobility of parylene monomer is strongly dependent on temperature and have empirically demonstrated parylene's enhanced pore sealing capability at elevated deposition temperatures.

Standard teachings in the art teach that parylene should be deposited at room temperature, which is 25° C. (i.e., standard ambient temperature). Deviation from this common standard by heated the parylene would result in a parylene coating that would be thinner, and/or the deposition rate would be slowed. Further, more parylene may be wasted due to leakage or coating of non-workpiece parts at higher deposition temperatures.

Specialty Coating Systems, Inc. of Indianapolis, Ind., U.S.A., manufactures the SCS PDS 2035CR Parylene Deposition System. In its vaporization chamber, dimer di-para-xylylene is vaporized at 150° C. @ 1.0 torr. In its pyrolysis chamber, monomer para-xylylene is pyrolized at 680° C. @ 0.5 torr. SCS teaches that in its deposition chamber, polymer polylpara-xylylene is deposited at 25° C. @ 0.1 torr. In such a deposition system, parylene coatings can range in thickness from hundreds of angstroms to several mils (i.e., thousandths of an inch). A typical thickness is in the micron (µm) range.

Parylenes have a critical deposition temperature called the "threshold temperature" above which practically little deposition is observed. The threshold temperature for parylene N is 40° C., and for parylene C it is 90° C. The threshold temperature for parylene D is 135° C., and for parylene AF-4 it is 30-35° C.

However, the inventors found that deposition can still happen for all parylene types at a temperature even above some of those threshold temperatures if deposition time is long enough. For example, deposition at 80° C., either on just the surface or throughout the monomeric gas, can lead to ~1 μm-thick films for all parylene types when deposition times are between 5 to 9 hours. At a sustained elevated gas temperature, the surface being deposited should come into equilibrium at the same temperature as the gas. Deposition temperatures can range from 60° C. to 100° C., and even up to 120° C. This temperature range is believed to be able to assist the pore penetration and be compatible with practical deposition times across a range of parylenes.

"About" in reference to a temperature or other engineering units includes measurements or settings that are within ±1%, ±2%, ±5%, ±10%, or other tolerances of the specified engineering units as known in the art.

A "porous" material, or medium, includes a material having a porosity or void fraction of space-to-matrix equal to or greater than 0.10, 0.15, 0.20, or as otherwise known in the art. A porous material will pass liquid or gas. Some porous materials can appear to the unaided human eye to be solid, such as PDMS silicones, but transmit water or other liquids through nanometer-sized pores. Media such as 5% porous glass, dimethyle siloxane, decamethyl cyclopentasiloxane, and silicone resin are other examples of porous material.

Porous materials can be classified into several kinds according to pore size. According to International Union of Pure and Applied Chemistry (IUPAC) notation, microporous materials have pore diameters of less than 2 nm, mesoporous materials have pore diameters between 2 nm and 50 nm, and macroporous materials have pore diameters of greater than 50 nm. Example of microporous materials include zeolites, metal-organic frameworks, and PDMS silicones. Examples of mesoporous materials include certain kinds of silica, silicon, aluminum, and alumina that have similarly-sized fine miesopores. Mesoporous oxides of niobium, tantalum, titanium, zirconium, cerium, and tin are also examples.

"Integrally formed" parts include those that are deposited, etched, cured, or formed at the same time as one another such that the result is that they are connected by a common material with one another, or as otherwise known in the art.

A "root" structure includes a geometrically irregular structure (e.g., like a tree root) or a geometrically regular structure (e.g., like a pin in a pin grid array of a microprocessor) of one or more materials that descends below a surface of a porous second material, or as otherwise known in the art. Multiple root structures, whether irregular or regular themselves, can be randomly dispersed or regularly patterned with respect to one another. Root structures can begin at different points at the surface and join below the surface.

A "nano root structure" includes root structures with features with a size on the order of nanometers, or as otherwise known in the art. For example, features may be ¼, ½, or ¾ nanometers up to tens or low hundreds of nanometers. There can be overlap between what are considered nano root structures, micro root structures, and pico root structures.

Figure 1A:
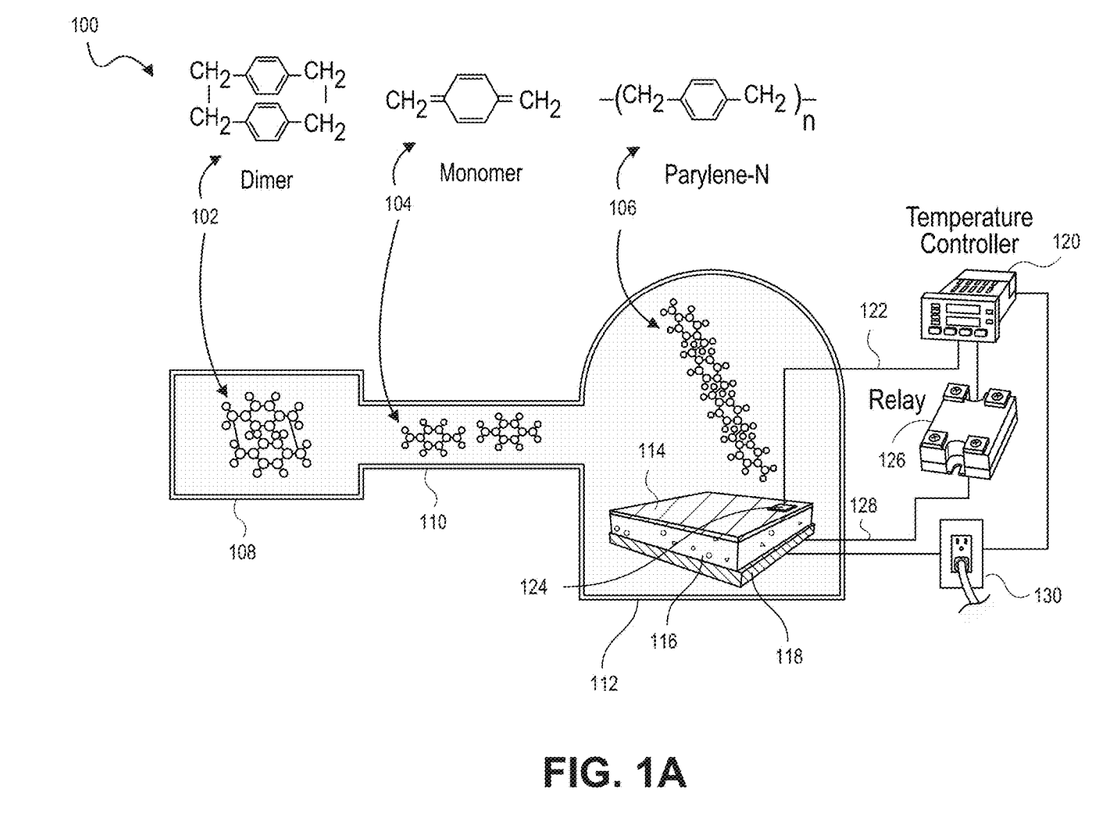
FIG. 1A diagrams a manufacturing system in accordance with an embodiment.
Figure 1B:
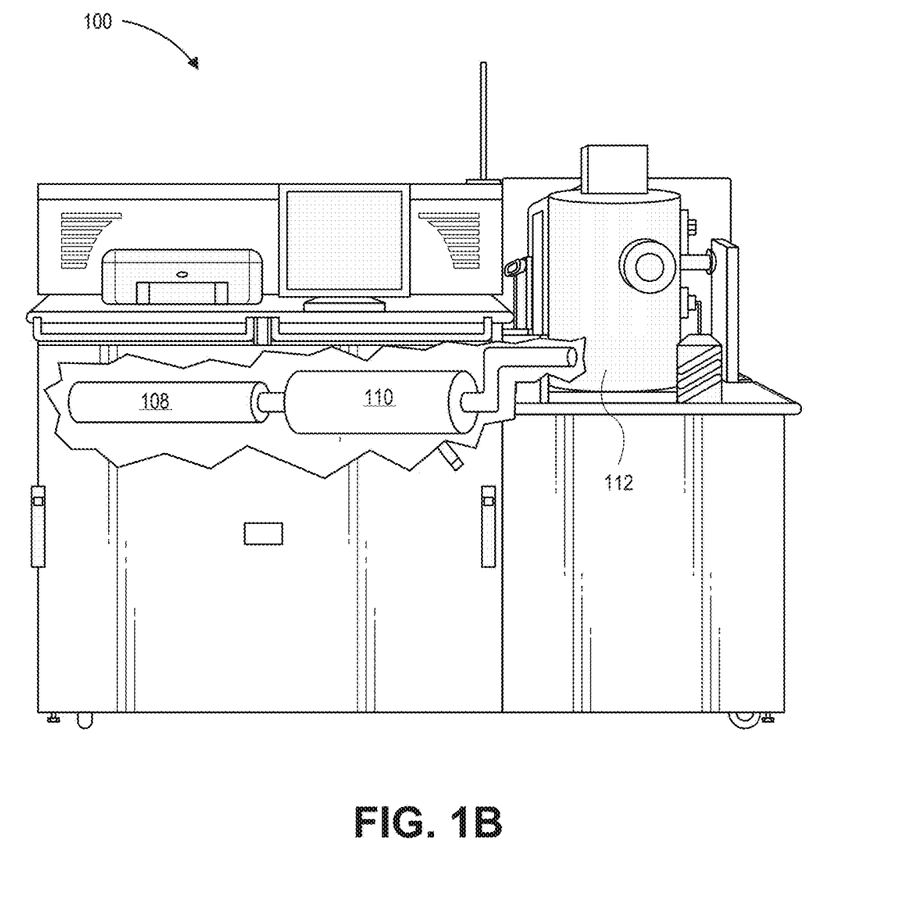
FIG. 1B illustrates a laboratory-based vapor deposition polymerization machine in accordance with an embodiment.

FIGS. 1A and 1B are a manufacturing system diagram and elevation view of a corresponding physical laboratory-grade machine in accordance with an embodiment. In vapor deposition polymerization system 100 there are vaporizer 108, pyrolysis tube 110, deposition chamber 112, and an in-situ heating controller.

Powdered dimer 102 is loaded into vaporizer 108 and then vaporized into a dimeric gas. The dimeric gas passes to pyrolysis tube 110, where it is pyrolyzed into a monomeric gas. The monomeric gas then is fed into deposition chamber 112.

A closed-loop temperature control system controls electric heater 118 inside deposition chamber 112. In the exemplary embodiment, type K thermocouple 124 is glued to the surface of PDMS substrate 116 and is connected via lines 122 to temperature controller 120 outside the deposition chamber. Temperature controller 120 controls relay 126, which provides power (supplied by standard power outlet 130) through cable 128 to electric heater 118 inside the deposition chamber.

Using the temperature control system, thermocouple 124—and the top surface PDMS 116—is kept at the target temperature. In this case, the target temperature is between 80° C. and 85° C. Temperatures between 60° C. and 120° C. can work as well.

In deposition chamber 112, the monomeric gas in its gaseous state is generally at room temperature (i.e., 25° C.). But it is deposited onto a surface that is 80-85° C. At this temperature, the parylene has a higher surface mobility when in contact with the PDMS, and it finds its way into nanometer-scale crevices, voids, and other pores of the porous PDMS. The deposited parylene fills up the pores to the top, forming nano root structures within the pores. As deposition continues at the described temperatures, a top surface layer of parylene forms over the top side of the matrix portion of the porous material as well as over the top of the nano roots. The layer, formed essentially without temporal interruption in the same batch and essentially at the same time as the nano roots, is integrally formed with the nano root structures and can be referred to as coating 114.

After cooling, the surface layer of parylene, integrally formed with the nano root structures that hold fast to pockets within the porous material, can be shown to adheres better to the PDMS than a layer of parylene deposited at room temperature.

Figure 2:
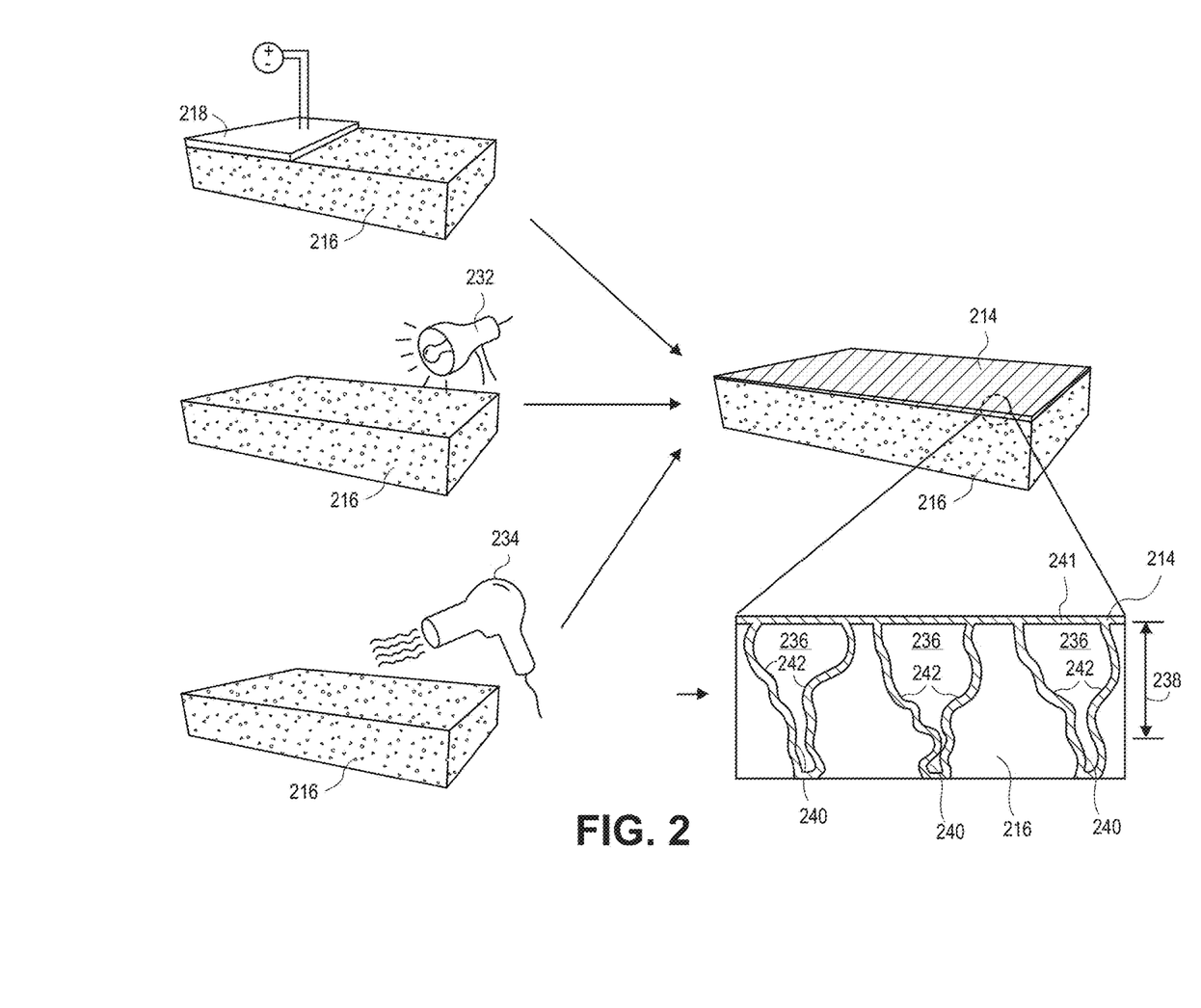
FIG. 2 illustrates surface heating techniques to grow root structures in accordance with an embodiment.

FIG. 2 illustrates surface heating techniques to grow root structures in accordance with an embodiment. Top surface of porous material 216 can be heated by adjacent heating pad 218, infrared or ultraviolet lamp 232, or hot air gun 234 (blowing convective air currents) during deposition. For thinner materials, such as those with thicknesses equal to or less that about 10% of a length and a width of the material, a heating pad opposite the surface (as in FIG. 1A) works well.

Coating 214 has nano roots extending into porous material 216. Pores 236 extend irregularly into the porous material. The sides of pores 236 are coated with shells 242 of parylene, which sometimes fill a pore completely with solid parylene. Both the solid and hollow shells of parylene extend below the surface of porous material 216 form roots 240. Roots 240 are integrally formed with surface coating 241.

Roots 240 extend to a depth 238 of at least 8 μm, and often 10.5 μm or more within the porous surface. These depths of roots have been shown to increase both adhesion strength and peeling strength of parylene C by 160% over that of parylene deposited at room temperature on the same porous bulk material.

In some embodiments, the temperature of the monomeric gas is elevated to a range including and between 60° C. and 120° C. instead of, or in addition to, heating the surface to be coated.

Figure 3:
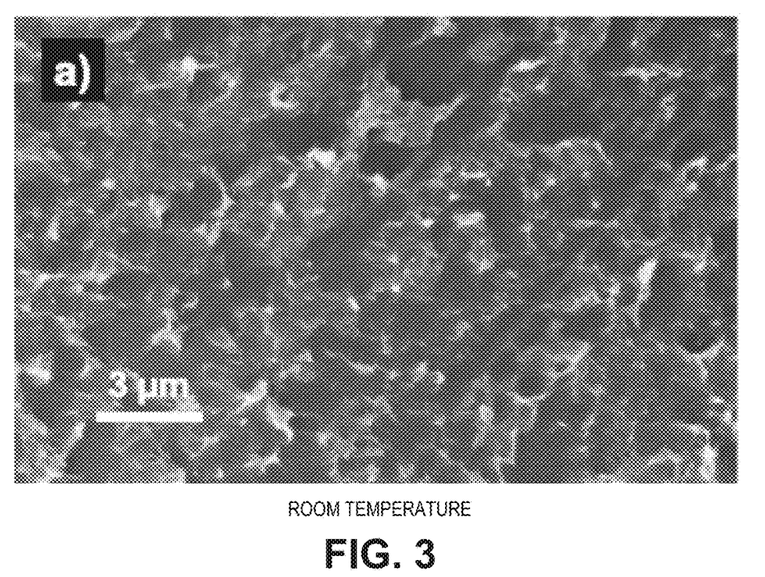
FIG. 3 is a scanning electron microscope image of parylene deposited at 25° C. as known in the prior art.
Figure 4:
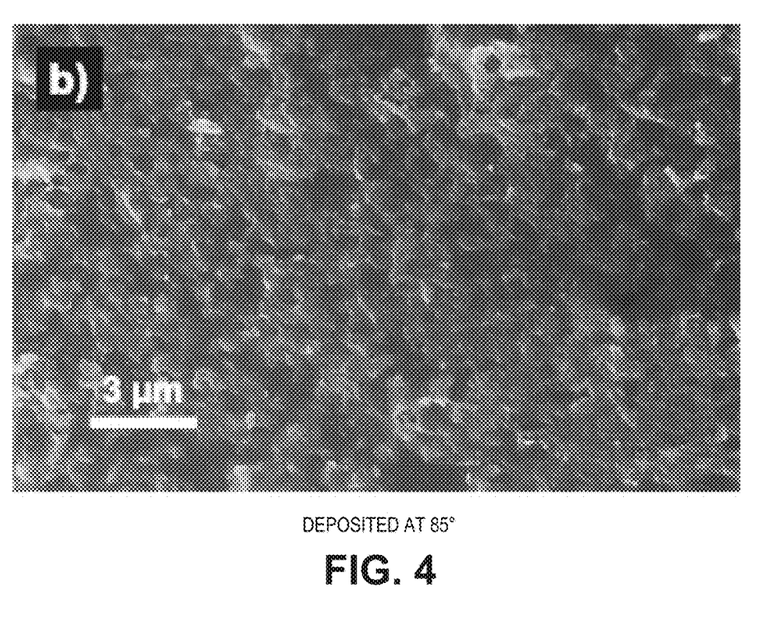
FIG. 4 is a scanning electron microscope image of parylene deposited at 85° C. in accordance with an embodiment.

FIGS. 3-4 are scanning electron microscope images of parylene deposited at 25° C. and at 85° C., respectively. To create the images, parylene C films were deposited at each temperature onto porous glass (Vycor 7930). The glass substrates were then dissolved completely in buffered hydrogen fluoride (BHF) solution. The bottom sides (i.e., interface sides) of the parylene C samples were examined under scanning electron microscope (SEM).

The parylene in FIG. 4 (deposited onto an 85° C. surface) shows much more densely packed microstructures than those in FIG. 3 (deposited onto a 25° C. surface). This is stark visual evidence of enhanced parylene penetration for deposition at elevated surface temperatures.

FIGS. 5-8 are experimentally measured depth profiles for parylene N, C, D, and AF-4. They are the results of secondary ion mass spectroscopy (SIMS), which sputter etches a surface into the depth and measures specific atomic species distribution simultaneously, on each of the types of parylene deposited onto an 80° C. PDMS surface. In all of the figures, $^{28}$Si represents PDMS.

Figure 5:
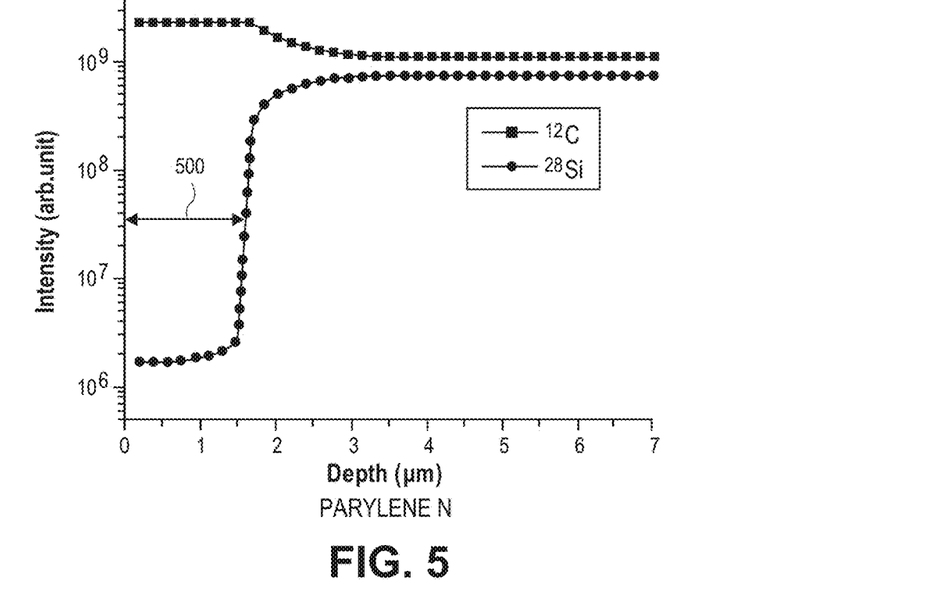
FIG. 5 is an experimentally measured depth profile for parylene N in accordance with an embodiment.

In FIG. 5, the $^{12}$C profile represents parylene N. At depth 500 of about 1.61 μm, $^{12}$C drops off and $^{28}$Si shoots rapidly up, indicating that the surface coating is about 1.61 μm in thickness. At greater depths, the $^{12}$C ramps down and $^{28}$Si levels off relatively slowly until they even out at about 3 μm. This indicates that there are roots extending from about 1.61 μm to about 3 μm. That is, the depth of the roots below the original surface of the porous material is about 1.4 μm.

Figure 6:
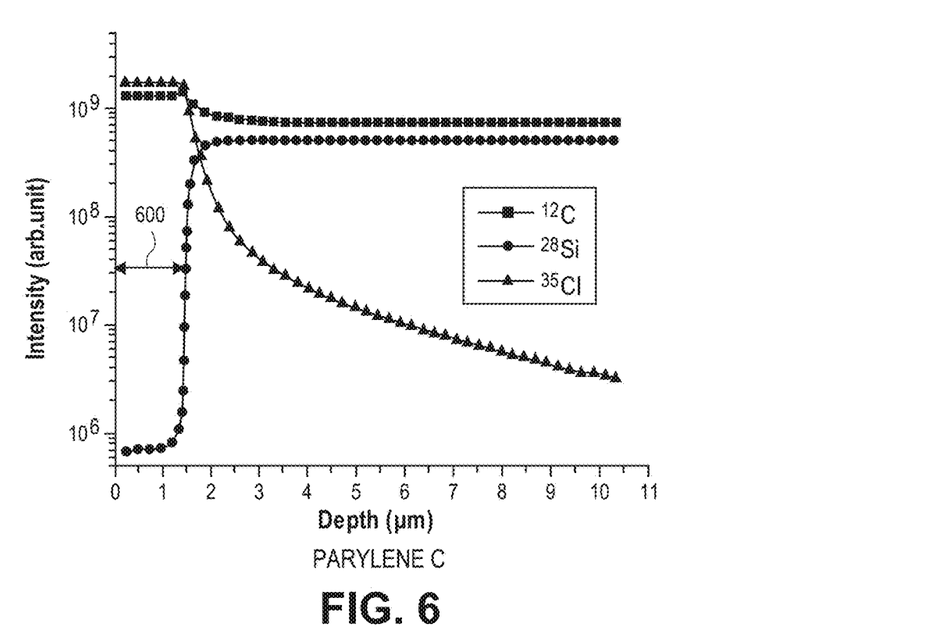
FIG. 6 is an experimentally measured depth profile for parylene C in accordance with an embodiment.

In FIG. 6, the $^{35}$Cl profile represents parylene C. At depth 600 of about 1.41 μm, $^{35}$Cl (and $^{12}$C) drops off and $^{28}$Si shoots rapidly up, indicating that the surface coating is about 1.41 μm in thickness. At greater depths, the $^{35}$Cl ramps down relatively slowly, still measureable at 10.5 μm in parts per thousand of its density in the surface coating. This indicates that the parylene C roots extend from 1.41 μm to 10.5 μm. That is, the depth of the roots below the original surface of the porous material is about 9.1 μm.

Figure 7:
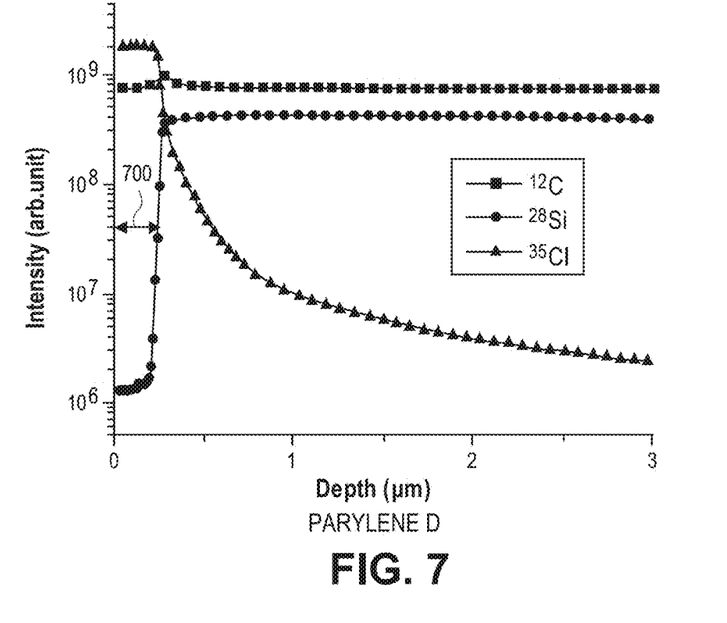
FIG. 7 is an experimentally measured depth profile for parylene D in accordance with an embodiment.

In FIG. 7, the $^{35}$Cl profile represents parylene D. At depth 700 of about 0.21 μm, $^{35}$Cl drops off and $^{28}$Si shoots rapidly up, indicating that the surface coating is about 0.21 μm in thickness. At greater depths, the $^{35}$Cl ramps down relatively slowly, still measureable at 3.0 μm in parts per thousand of its density in the surface coating. This indicates that the parylene D roots extend from 0.21 μm to 3.0 μm. That is, the depth of the roots below the original surface of the porous material is about 2.8 μm.

Figure 8:
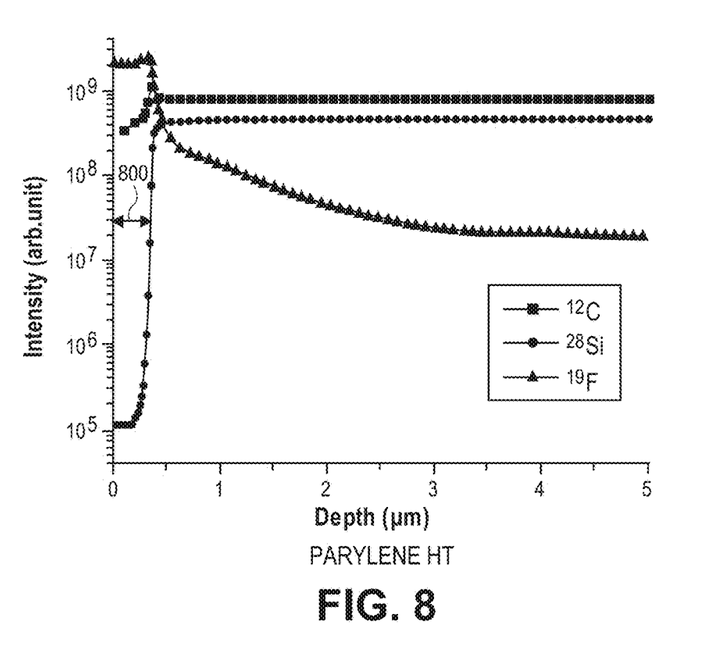
FIG. 8 is an experimentally measured depth profile for parylene AF-4 in accordance with an embodiment.

In FIG. 8, the $^{19}$F profile represents parylene AF-4. At depth 800 of about 0.34 μm, $^{19}$F drops off and $^{28}$Si shoots rapidly up, indicating that the surface coating is about 0.34 μm in thickness. At greater depths, the $^{19}$F ramps down relatively slowly, leveling off at about 3.0 μm. This indicates that the parylene AF-4 roots extend from 0.34 μm to 3.0 μm. That is, the depth of the roots below the original surface of the porous material is about 2.7 μm.

Figure 9:
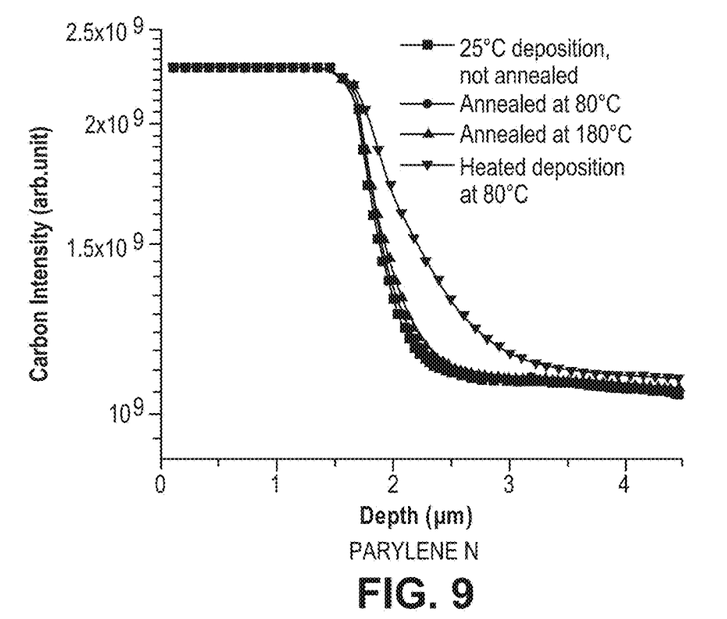
FIG. 9 is a comparison chart of experimentally measured depth profiles for various manufacturing methods of parylene N.
Figure 10:
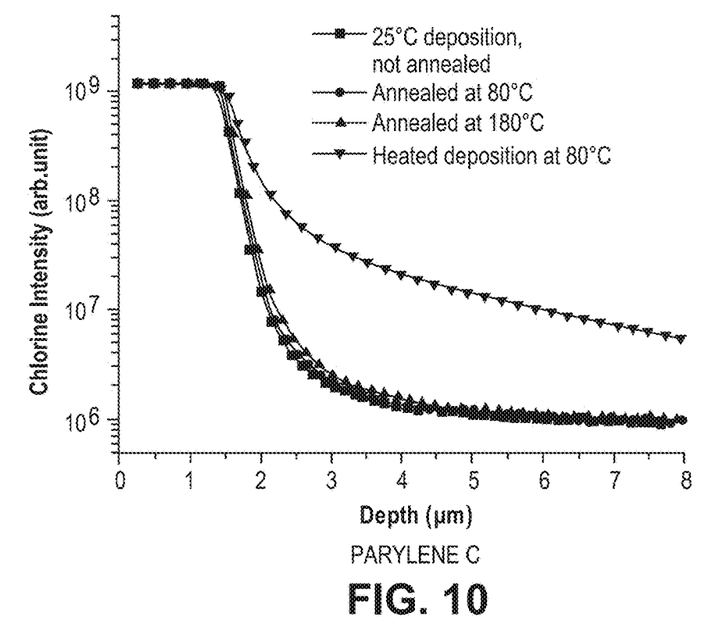
FIG. 10 is a comparison chart of experimentally measured depth profiles for various manufacturing methods for parylene C.

FIGS. 9-10 are comparison charts of experimentally measured depth profiles for various manufacturing methods of parylene N and C, respectively. They are the results of the same secondary ion mass spectroscopy (SIMS) conducted for the previous figures.

For the four experiments in each figure, the respective parylene was deposited on three 25° C. surfaces and one 80° C. surface to polymerize. Two of the 25° C.-surface-deposited parylenes were then annealed, one at 80° C. and the other at 180° C.

In FIG. 9, the $^{12}$C profile represents parylene N. For the 25° C.-surface-deposited parylene Ns, the $^{12}$C intensity drops off rapidly, while that for the 80° C.-surface-deposited parylene N falls off more slowly. The horizontal difference in the 80° C.-surface-deposited parylene N curve indicates the presence of roots.

In FIG. 10, the $^{35}$Cl profile represents parylene C. For the 25° C.-surface-deposited parylene Cs, the $^{35}$Cl intensity drops off rapidly, while that for the 80° C.-surface-deposited parylene C falls off more slowly. The horizontal difference in the 80° C.-surface-deposited parylene C curve indicates the presence of roots.

These results show that annealing, or simply heating the samples—after they had already polymerized—is relatively ineffective at creating roots. In contrast, heating the surface to be coated at the proper temperature clearly created roots within the porous sample, resulting in a composition of matter that has roots extending well below the surface of the porous material.

Figure 11:
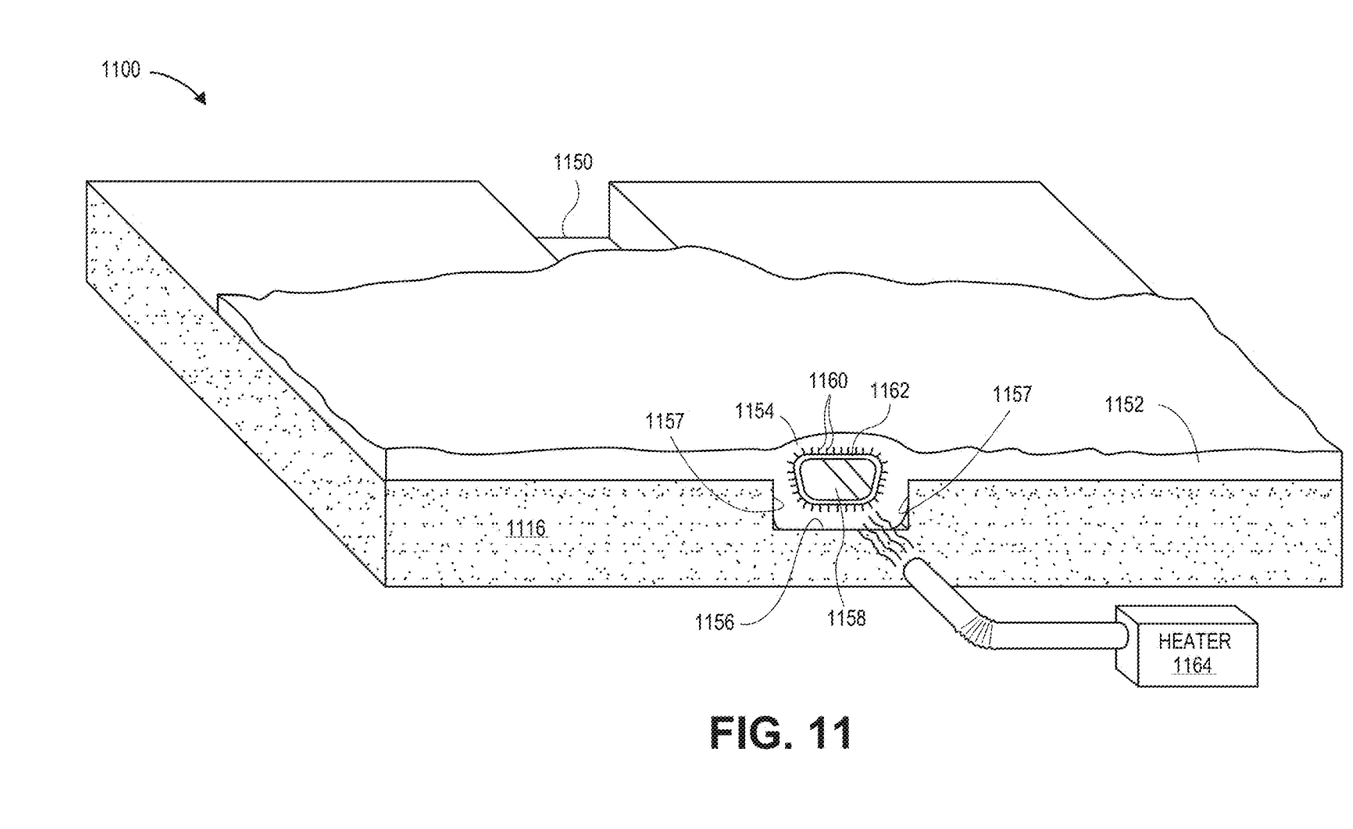
FIG. 11 illustrates a method of manufacturing an integrated microfluidic liquid chromatography device in accordance with an embodiment.

FIG. 11 illustrates a method of manufacturing an integrated microfluidic liquid chromatography device in accordance with an embodiment. In device 1100, glass substrate 1116 has been etched using photolithography to create etched channel 1150. Etched channel has bottom 1156 and sides 1157.

PDMS 1152 has been coated into and over etched channel 1150 sufficient to coat a portion of bottom 1156 and sides 1157. Further, the PDMS has been further coated over the channel sufficient to seal over the channel with bridge region 1154 and create tunnel region 1158. Thus, a PDMS film with tunnel 1158 therethrough has been formed.

Yet, tunnel 1158 is permeable to liquids because PDMS is permeable. As a further manufacturing step, heater 1164 blows hot air through tunnel 1158 to heat the inner tunnel surfaces between a range of 60° C. and 120° C. Monomeric parylene gas is then fed through the tunnel while the surfaces are at temperature. The parylene works its way into the pores of the PDMS, creating root structures 1160. It also creates surface coating 1162 of parylene integrally formed with root structures 1160. The tunnel region is then allowed to cool.

The resulting tunnel can be used as a separation column or other feature of an integrated microfluidic liquid chromatography device. The device can be left on the glass substrate or peeled from it so that it is flexible.

Figure 12:
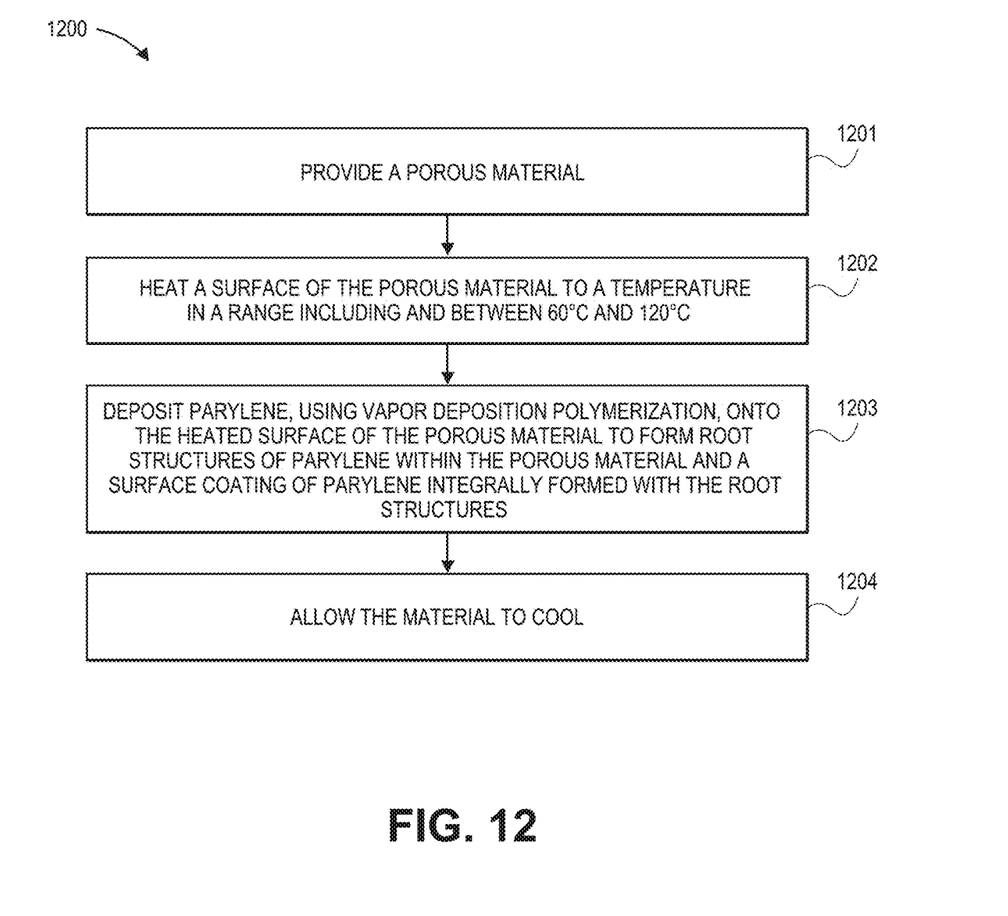
FIG. 12 is a flowchart illustrating a process in accordance with an embodiment.

FIG. 12 is a flowchart illustrating process 1200 in accordance with an embodiment. In operation 1201, a porous material, such as PDMS, is provided. In operation 1202, a surface of the porous material is heated to a temperature in a range including and between 60° C. and 120° C. In operation 1203, parylene is deposited, using vapor deposition polymerization, onto the heated surface of the porous material to form root structures of parylene within the porous material and a surface coating of parylene integrally formed with the root structures. In operation 1204, the material is allowed to cool.

Figure 13:
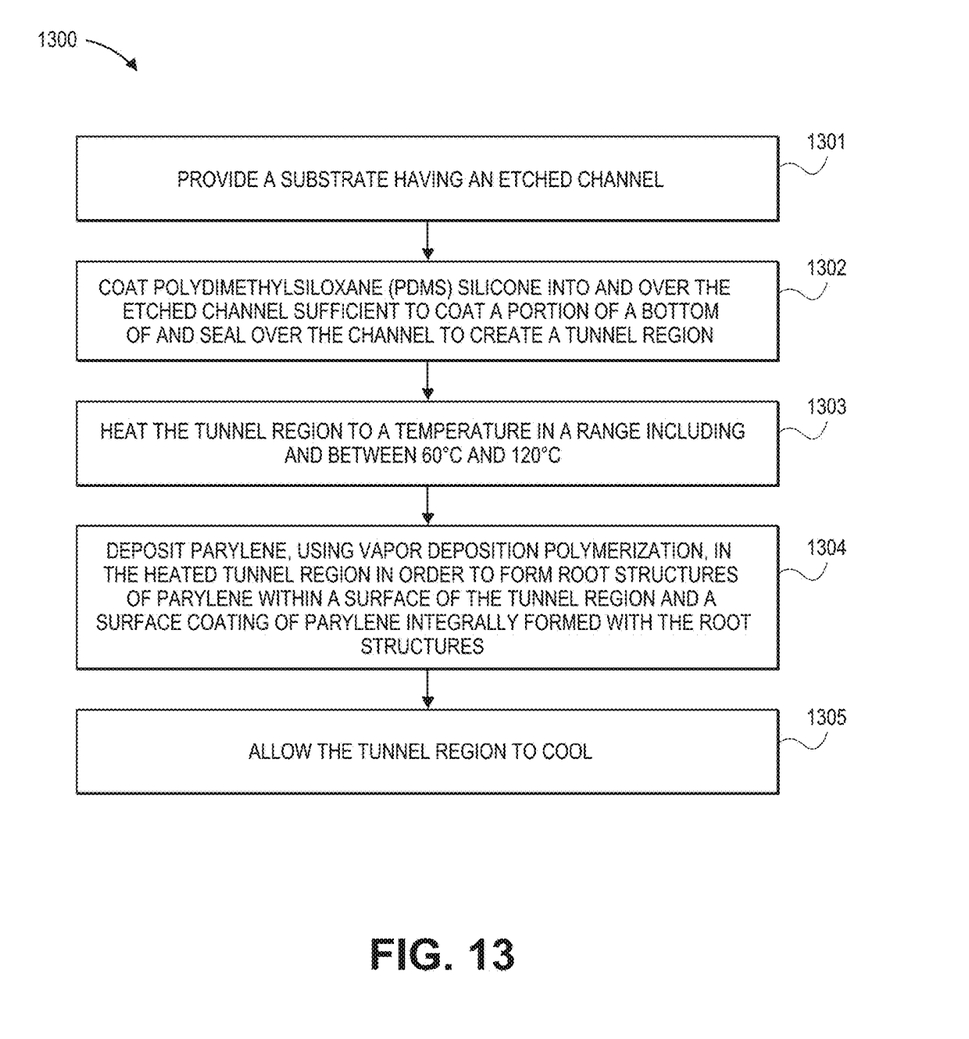
FIG. 13 is a flowchart illustrating a process in accordance with an embodiment.

FIG. 13 is a flowchart illustrating process 1300 in accordance with an embodiment. In operation 1301, a substrate having an etched channel is provided. In operation 1302, polydimethylsiloxane (PDMS) silicone is coated into and over the etched channel sufficient to coat a portion of a bottom of and seal over the channel to create a tunnel region. In operation 1303, the tunnel region is heated to a temperature in a range including and between 60° C. and 120° C. In operation 1304, parylene is deposited, using vapor deposition polymerization, in the heated tunnel region in order to form root structures of parylene within a surface of the tunnel region and a surface coating of parylene integrally formed with the root structures. In operation 1305, the tunnel region is allowed to cool.

The invention has been described with reference to various specific and illustrative embodiments. However, it should be understood that many variations and modifications may be made while remaining within the spirit and scope of the following claims.

What is claimed is:

1. A composition of matter, comprising:
   a polydimethylsiloxane (PDMS) silicone porous material having pores with diameters of less than 50 nm;
   a parylene coating over a surface of the porous material; and
   root structures of parylene extending from the surface of the porous material to a depth of at least 8 µm within the pores of the porous material, the root structures integrally formed with the parylene coating.

2. A composition of matter, comprising:
   a zeolite or a metal-organic framework porous material having pores with diameters of less than 50 nm;
   a parylene coating over a surface of the porous material; and
   root structures of parylene extending from the surface of the porous material to a depth of at least 8 µm within the pores of the porous material, the root structures integrally formed with the parylene coating.

3. The composition of matter of claim 2 wherein the porous material includes silica, silicon, aluminum, niobium, tantalum, titanium, zirconium, cerium, or tin.

4. The composition of matter of claim 2 wherein root structures are geometrically regular or irregular.

5. The composition of matter of claim 1 wherein the parylene is selected from the group consisting of parylene N, parylene C, parylene D, and parylene AF-4.

6. The composition of matter of claim 1 wherein the root structures of parylene extend from a surface of the porous material to a depth of at least 10.5 µm within the porous material.

7. A composition of matter, comprising:
   a 5% porous glass material having pores with diameters of less than 50 nm;
   a parylene coating over a surface of the porous glass material; and
   root structures of parylene extending from the surface of the porous glass material to a depth of at least 8 µm within the pores of the porous glass material, the root structures integrally formed with the parylene coating.

8. The composition of matter of claim 1 wherein the porous material is configured as a sheet such that a thickness of the sheet is equal to or less than 10% of a length and a width of the sheet.

9. The composition of matter of claim 1 wherein the porous material forms a tunnel region and the parylene forms root structures within a surface of the tunnel region that are integrally formed with the parylene coating over the surface of the tunnel region.

10. The composition of matter of claim 1 wherein the porous material includes an interlayer dielectric.

11. The composition of matter of claim 1 produced by heating the porous material to between 60° C. and 120° C. during deposition of the parylene.

12. The composition of matter of claim 11 produced by heating the porous material to between 80° C. and 85° C. during deposition of the parylene.

* * * * *